Patented Feb. 27, 1951

2,543,016

UNITED STATES PATENT OFFICE 2,543,016

CATALYTIC POLYMERIZATION

Aristid V. Grosse, Haverford, Pa., assignor to Houdry Process Corporation, Wilmington, Del., a corporation of Delaware No Drawing. Application April 1, 1946, Serial No. 658,866

6 Claims. (Cl. 260—677)

This invention relates to the production of high molecular weight hydrocarbons which boil generally above the gasoline range and are valuable as high flash point fuels, as stable mobile liquids for use in precision instruments, and as raw materials in the production of chemical compounds free of material of different molecular weight. The invention especially relates to the production of such high molecular hydrocarbons by a polymerization process utilizing mono-olefins as starting material.

Polymerization processes previously known to the art tend to produce, from mono-olefins, a variety of products due either to the action of the catalyst, to the complexity of the mono-olefinic material employed, or to the conditions, such as temperature and pressure, used in the polymerization. For example, such catalysts as aluminum chloride can cause extensive rearrangement and degradation of the hydrocarbon material involved with a consequent complexity of products, or, similarly, the polymerization of a complex mixture of mono-olefins having different molecular weights results in a product which generally has a range of molecular weights, due to the cross polymerization of the various mono-olefins. Even processes using catalysts which do not cause extensive rearrangement result in products having a considerable range of molecular weights when the catalyst is used under conditions which lead to depolymerization of the initial olefinic material and subsequent repolymerization. Available processes which produce polymers of relatively high molecular weight yield, as product, complex mixtures of polymers, these mixtures being composed of compounds having a range of boiling point and molecular weight. Upon hydrogenation these mixtures yield highly complex mixtures of saturated hydrocarbons.

I have found that mono-olefins having six to sixteen carbon atoms can be selectively dimerized by solid high surface area polymerization catalysts under liquid phase conditions, particularly at relatively low temperatures, such that cracking or degradation of the dimer is relatively minor or absent. I have found that a dimer so formed yields, on hydrogenation, saturated hydrocarbon material of relatively narrow, if any, boiling range and hence consists of hydrocarbons of the same molecular weight.

In accordance with one phase of my invention, I may obtain mono-olefinic material having from six to sixteen or more carbon atoms and consisting of material having the same molecular weight, from any source and thereafter dimerize such mono-olefinic material to form mono-olefinic dimers of from twelve to thirty-two or more carbon atoms. These dimers can be hydrogenated under non-destructive conditions to yield saturated hydrocarbon material which consists of hydrocarbons of a single molecular weight. Hydrogenated dimers of twelve to thirty-two carbon atoms have a single molecular weight in the range of 169 to 451. I may employ in my novel process of dimerization either mono-olefinic material derived from a previous dimerization or mono-olefinic material prepared by other processes, such as the dehydration of alcohols, the dehydrogenation of paraffin hydrocarbons or the cross polymerization of gaseous olefins of different molecular weight, but, in any case, the mono-olefinic material to be dimerized should contain substantially only hydrocarbons of the same molecular weight. I may use either a single mono-olefin or mixtures of mono-olefins, such as those formed by a previous dimerization, where such mixtures contain substantially only hydrocarbons of the same molecular weight; as, for example, di-isobutylene which contains principally olefins which have the same carbon skeleton but which have different positions of the olefinic double bond.

The dimerization is preferentially accomplished catalytically by contacting the mino-olefinic material under selected conditions with a solid high surface area polymerization catalyst; i. e., a porous catalyst which apparently does not react with the charge materials and which may be regenerated, after use, at elevated temperatures of the order of 600° to 1000° F. Such catalysts may be termed surface active solids and may be of natural or synthetic origin. Thus natural aluminosilicates, such as clays of the bentonite or kaolin type, may be used in their natural state or may be acid or otherwise treated to enhance any or all of their properties of catalytic polymerization activity, porosity, or durability. Inorganic gels of silica, alumina, magnesia, thoria, urania, zirconia, titania and/or mixtures of these materials can be prepared by various methods known to the art, impregnated with a phosphoric acid and calcined to produce a useful polymerization catalyst. Plural inorganic gels such as silica-alumina, silica-zirconia, silica-magnesia, silica-thoria and the like, or gels having more than two components, such as silica-alumina-zirconia, silica-zirconia-thoria and the like, may be prepared as colloidal gels having a high surface area that is active in catalyzing the dimerization process.

The mono-olefinic material is contacted with the solid catalyst at temperatures and for such contact times as are suited to the particular olefin material involved. Where the carbon skeleton of the mono-olefinic material contains six to eight carbon atoms and is highly branched and particularly where such branching is adjacent to or involves the carbon atoms forming the olefinic double bond, temperatures of about 20° to 225° F. and below 175° F. preferably are preferred while for mono-olefinic material, proportionately as highly branched and containing about sixteen carbon atoms, preferred temperatures are in the range 0° F. to 125° F. Less reactive mono-olefinic material such as straight or slightly branched chain hydrocarbons of about sixteen carbons, are dimerized at somewhat higher temperatures such as 125° F. to 350° F. Mono-olefins of intermediate structure or molecular weight are accordingly dimerized at temperatures intermediate to the ranges stated. With the ranges stated as a guide, a suitable temperature can be determined for any specific case. The temperature for any specific dimerization should, however, be below those temperatures at which substantial degradation or depolymerization of the product occurs. Thus, for example, in the dimerization of di-isobutylene to tetra-isobutylene, I have found that temperatures above 225° F. are unsuitable. When tetra-isobutylene was passed over a coprecipitated silica-alumina polymerization catalyst maintained at 212° F., about 5 to 10% degradation or depolymerization was observed. However, even at space velocities of 20 (volumes of liquid polymer at 60° F. per volume of catalyst per hour) a degradation of about 30% was indicated at about 300° F. while at about 390° F., about 70% degradation was indicated. Thus a range of 30° to 150° F. will assure selective dimerization of di-isobutylene without appreciable degradation or polymerization of a higher order although the higher temperatures noted above may be used in order to accelerate the process where a minor amount of degradation is unimportant. The phenomenon of degradation or depolymerization will be observed in connection with other dimers and it is therefore preferred to dimerize under conditions that do not favor such action.

The hydrogenation of mono-olefins polymerized by my novel process can be accomplished by methods known to the art by using catalysts such as nickel, copper, platinum or palladium, oxides or sulfides of chromium, tungsten or molybdenum or the like under conditions that do not cause destruction or degradation of the olefinic polymer.

In accordance with one embodiment of my invention, I dimerize mono-olefinic material, such as mono-olefinic material which contains six to sixteen carbon atoms or higher and consists of material having the same molecular weight and which has been formed by a previous selective dimerization, under conditions selected to favor a further selective dimerization reaction using a solid high surface area polymerization catalyst and thereby form a tetramer of the original mono-olefinic material. When using the same or similar catalyst for the successive dimerizations which is preferred, selectivity of reaction to form dimers predominantly and even substantially exclusively is obtained when the successive dimerization steps are effected at successively lower temperatures as indicated by the exemplary temperature ranges given herein. I may then hydrogenate the tetramer so formed to a saturated hydrocarbon material containing substantially only hydrocarbons of the same molecular weight or I may again polymerize the tetramer in the absence of other polymers to form the octamer using the same catalyst at a lower temperature. Hydrogenation of the octamer produces, as in the case of the tetramer, saturated hydrocarbon material of a single molecular weight. I prefer to employ, for any particular dimerization, mono-olefins having the same molecular weight.

Thus, for example, I can produce saturated hydrocarbon material boiling above the gasoline range (about 400° F.) and therefore having low volatility and little, if any, boiling range from gaseous or volatile liquid mono-olefins, although my invention is not limited to such a process. I prefer to use the solid high surface area catalysts of the type described herein and to operate at pressures that keep the reactants under liquid phase conditions. A dimer which is to be polymerized to a tetramer, can conveniently be formed by dimerization of selected gaseous or highly volatile mono-olefins containing from three to five carbon atoms. In general, I prefer to use higher temperatures when polymerizing straight chain or low molecular weight mono-olefins than when polymerizing high branched chain or high molecular weight mono-olefins. Temperature ranges which are applicable to the formation of dimers from mono-olefinic material containing from three to five carbons are: for propylene, 250° to 450° F.; for normal butenes 200° to 350° F.; for isobutene, 100° to 300° F. and preferably from about 150° F. to 250° F.; for normal pentenes, 150° to 400° F.; and for iso-pentenes, 30° F. to 250° F. The time of contact is inversely related to the temperature and short times of contact and high temperatures can be employed or lower temperatures with correspondingly longer times of contact. In those cases where the dimerization is not complete or where higher polymers, such as trimers, are formed to some extent, the dimer may be separated from the remainder of the reaction mixture by any convenient means, such as distillation. Separation of a dimer from a monomer or a trimer by distillation is moderately easy because of the relatively large difference in boiling points.

When hydrocarbons of sufficiently high molecular weight to boil above the gasoline range, such as mono-olefins containing six to sixteen carbon atoms and hence having a molecular weight in the range 167 to 449, are produced by my novel polymerization processes from lower boiling mono-olefin material by successive dimerization steps, using mono-olefinic material of substantially a single molecular weight in each dimerization step, the yield of the desired product is much higher than if the several dimerization steps were performed in a single step; as, for example, where a tetramer is produced in a single step process from an acyclic monomer. For example, I have observed that isobutylene, when contacted with a coprecipitated silica-alumina catalyst at about 32° F. for sufficient time to produce over 95% polymerization, produces a variety of products. These products consist of small amounts of dimer (less than 20 volume per cent), trimer, tetramer and polymers boiling higher than the tetramer; the amount of tetramer being less than 20 volume per cent of the polymers produced. However, as shown in Example I, the dimerization of di-isobutylene to tetra-isobutylene is essentially complete and selective at approximately the same temperature using the same catalyst. Thus, by my novel polymerization process, it is possible to dimerize mono-olefins in a series of steps each of which steps is performed at conditions including temperatures that favor the desired dimerization. Furthermore, since I may use reactive mono-olefinic material consisting of substantially only mono-olefins of the same molecular weight in each of the dimerization steps, I obtain products having a predominantly single molecular weight.

The above description of my invention may be illustrated by the following examples, which should not be construed, however, as limiting the practice thereof.

*Example I*

Di-isobutylene, the dimer of isobutylene, was cooled to 32° F. and placed in a container in an ice bath and pellets of a synthetic silica-alumina gel were added until the di-isobutylene just covered the pellets (the ratio of volume of pellets to volume of di-isobutylene was 5 to 4). The pellets were added in small portions and reaction was observed after each addition. The pellets and di-isobutylene were allowed to come to room temperature (about 80° F.) over night. The progress of the dimerization was followed by measuring the refractive index of the reaction mixture with results as follows:

|  | $n_D^{25°\,C.}$ |
|---|---|
| Original di-isobutylene | 1.4102 |
| After 1 hour at 32° F | 1.4140 |
| Next day at room temperature | 1.4467 |

The liquid reaction products were recovered by draining the pellets and then extracting the pellets several times with alcohol. The alcoholic extract was drained from the pellets and then the water was added to displace the hydrocarbon extracted from the pellets. The liquid recovered in this manner was equivalent to 96.5% by weight of the original di-isobutylene. The reaction products were dried with $CaCl_2$ and distilled at about 60 mm. of mercury pressure in a distilling column packed with glass helices and having the equivalent of 20 theoretical plates at a 15:1 reflux-ratio. Less than 5 volume per cent of the distillate distilled below 297° F., while the remainder of the distillate (tetra-isobutylene) distilled between 297° and 300° F. The bulk of the relatively constant boiling distillate was collected in five fractions constituting 78 volume per cent of the charge, which fractions varied in refractive index by only 0.0002. The yield of tetra-isobutylene, calculated from the recovery and the boiling point curve, was not less than 93 weight per cent. The middle fraction of the constant boiling distillate of tetra-isobutylene had the following properties:

| Refractive index $n_D^{20°\,C.}$ | 1.4499 |
|---|---|
| Density gm./cc., $d_4^{20}$ | 0.7946 |
| Dispersion, $n_F-n_C$ at 20° C. $\times 10^4$ | 91 |
| Specific dispersion $\frac{n_F-n_C}{d}\times 10^4$ | 115 |
| Bromine number, modified Francis method | 77 |
| Boiling point, °C.: |  |
| At 60 mm. Hg | 148.7 |
| At 759 mm. Hg | 243.3 |

*Example II*

Distilled tetra-isobutylene from several runs made under the conditions of Example I was hydrogenated in several batches in a high pressure bomb using hydrogen gas and a catalyst (5 weight per cent nickel oxide on kieselguhr).

The conditions of hydrogenation were: temperature, 225° C.; initial pressure of hydrogen, 100 atmospheres; maximum pressure of hydrogen, about 165 atmospheres; and time, 18 to 25 hours. The hydrogenated product was distilled under similar conditions to those given in Example I to yield less than 2% of distillate boiling less than 310.7° F. (at 59.5 mm. Hg) while the remainder of the distillate (about 90% of the charge) was constant boiling at 310.7° F. Four fractions of the constant boiling distillate (73% of the charge) had a variation of only 0.0004 in refractive index. The properties of the hydrogenated tetra-isobutylene purified by distillation were measured with results as follows:

| Boiling point: |  |
|---|---|
| At 760.0 mm. Hg | 250.7° C. / 483.3° F. |
| At 59.5 mm. Hg | 154.8° C. |

Melting point solidified to a glassy solid at −78° C. and did not crystallize on long standing at that temperature.

| Density gm./cc.: |  |
|---|---|
| At 0° C | 0.7985 |
| At 20° C | 0.7854 |
| Refractive index $n_D^{20°\,C.}$ | 1.4399 |
| Dispersion $n_F-n_C\times 10^4$ at 20° C | 77 |
| Specific dispersion $\frac{n_F-n_C}{d}\times 10^4$ at 20° C | 98 |
| Viscosity centistokes: |  |
| At 0° C | 8.65 |
| At 20° C | 4.95 |
| At 35° C | 3.46 |
| At 55° C | 2.42 |

The experimental molecular refraction (Lorenz-Lorentz) was calculated to be 75.97; theoretical for $C_{16}H_{34}$ is 76.09. The amount of hydrogen in the hydrogenated tetra-isobutylene was found by a modified sulfur determination lamp method to be 15.11±0.03% (theoretical for $C_{16}H_{34}$ is 15.14).

The hydrogenated tetra-isobutylene is accordingly an octadecane. The probable structure of the compound is either 2,2,4 6,6 8,8—heptamethylnonane or 3-t-butyl-2,4,4,6,6—pentamethylnonane. These structures are, however, speculative and should not be construed as limiting my invention.

*Example III*

Cetene, a normal hexadecene, was contacted with another sample of the same synthetic silica-alumina catalyst and in the manner as was the di-isobutylene in Example I except that the temperature used was room temperaure (about 75° F.). After 170 hours, the liquid was removed from the catalyst and analyzed by a vacuum distillation using a 12 inch Vigreux column. The distillation curve showed that no reaction had taken place.

The above run was repeated using a temperature of 212° F. After 50 hours of contact, approximately 65% of a dimer of cetene was formed. The dimer of cetene, separated by distillation, had the following properties:

| Refractive index, $n_D^{20°C.}$ | 1.4602 |
|---|---|
| Density, gm./cc., $d_4^{20}$ | 0.8211 |
| Dispersion, $n_F-n_C\times 10^4$ at 20° C | 87 |
| Specific dispersion, $\frac{n_F-n_C}{d}$ at 20° C | 0.0106 |
| Bromine number, modified Francis method | 33.5 |
| Boiling range at 0.15–0.16 mm. Hg °C | 200–210 |
| Viscosity, Saybolt Universal, at 100° F., in seconds | 92 |

In the above examples, a synthetic silica-alumina gel type of catalyst was used. This catalyst contained silica and alumina in a weight ratio of 7 to 1 and was co-precipitated from solutions containing sodium silicate, sodium aluminate and ammonium sulfate in such proportions as to give a hydrogel of about 8 pH. This gel was washed free of soluble salts and the zeolitically held sodium removed by base exchange. After pelleting, the gel was calcined above 800° F. to give hard coherent pellets which were then used in the above examples. Other weight ratios of silica to alumina are also effective, such as ratios between 50 to 1 and 2 to 1 and other methods of preparing the finished catalyst may be used, such dipping the gel of one component in a solution of the other component, compositing moist gels of the two components, intimate mixing and grinding of the gels of the two components and the like.

Among the features of the present invention is the production of hydrocarbons of little or no boiling range. The saturated hydrocarbons that can be produced are useful in electrical apparatus, in instruments where stable liquids of reduced fire hazard (low flash point) are needed, or may be used as specialty fuels or lubricants. The unsaturated hydrocarbons produced by my novel dimerization process are excellent raw materials for the production of chemicals since they have a single molecular weight. From these unsaturated hydrocarbons, detergents or wetting agents, alcohols or high molecular weight amines and the like may be prepared. The products formed by the novel processes described above are composed of hydrocarbons of a single molecular weight and are to be distinguished from other polymerization processes which result in products having a range of molecular weights and consequently a considerable range of properties. The catalysts used in the processes described above are rugged and since they are not depleted or harmed, they may be used in the process, then regenerated and reused.

Inasmuch as many modifications and variations of the invention as hereinbefore set forth may be made without departing from the spirit and scope thereof, only such limitations should be imposed on the invention as are indicated in the appended claims.

I claim as my invention:

1. The process which comprises polymerizing olefins having four carbon atoms in three successive dimerization steps and thereby producing a reaction mixture in each step, using in each dimerization step an active solid high surface area siliceous polymerization catalyst of the same composition and method of preparation, maintaining liquid phase conditions and successively lower temperatures in each dimerization step, separating dimer from reaction mixture intermediate each of said steps and using dimer so separated as the starting material for the next step, thereby dimerizing in all dimerization steps substantially only mono-olefins having a single molecular weight and dimerizing in the last step mono-olefins having sixteen carbon atoms to substantially only mono-olefins having thirty-two carbon atoms.

2. The process of claim 1 in which the active solid high surface area polymerization catalyst is a synthetically prepared silica-alumina gel.

3. The process which comprises polymerizing a straight chain hexadecene under liquid phase conditions at temperatures in the range of 125° to 350° F. and in the presence of an active solid high surface area polymerization catalyst to form products comprising predominately dimerized hexadecene.

4. The process which comprises polymerizing a straight chain hexadecene at temperatures in the range of 125° to 350° F. in the presence of a synthetically prepared silica-alumina gel to form products comprising predominately dimerized hexadecene.

5. The process which comprises polymerizing cetene at temperatures of about 212° F. under liquid phase conditions and in the presence of a synthetically prepared silica-alumina gel having a weight ratio of silica to alumina of about 7 to 1 to form products comprising predominately dimerized cetene, said gel having been prepared by coprecipitating a gel from solutions containing an alkali silicate and an alkali aluminate at about a pH of 8, removing zeolitically held alkali by base exchange and calcining said gel at temperatures above 800° F.

6. Mono-olefinic hydrocarbon material having thirty-two carbon atoms and having a boiling range at a pressure of 0.15 to 0.16 millimeter of mercury of about 200° to 210° C., a specific dispersion measured at 20° C. using the F and C lines of hydrogen of about 0.0106 and a Saybolt Universal viscosity of about 92 seconds at 100° F. and prepared by polymerizing a straight chain hexadecene under liquid phase conditions at temperatures in the range of 125° to 350° F. and in the presence of an active solid high surface area polymerization catalyst.

ARISTID V. GROSSE.

REFERENCES CITED

The following references are of record in the file of this patent:

UNITED STATES PATENTS

| Number | Name | Date |
| --- | --- | --- |
| 2,197,862 | Hyman | Apr. 30, 1940 |
| 2,283,499 | Hachmuth | May 19, 1942 |
| 2,318,719 | Schneider et al. | May 11, 1943 |

OTHER REFERENCES

Lebedev et al.: Ber. 63, 103–112 (1930).